C. A. MORRISON.
ELASTIC NON-INFLATABLE TIRE.
APPLICATION FILED JUNE 4, 1919.

1,313,007.

Patented Aug. 12, 1919.

Inventor:
C. A. Morrison.
E. W. Anderson
Attorneys

UNITED STATES PATENT OFFICE.

CARY A. MORRISON, OF DELAWARE, OHIO.

ELASTIC NON-INFLATABLE TIRE.

1,313,007. Specification of Letters Patent. Patented Aug. 12, 1919.

Application filed June 4, 1919. Serial No. 301,647.

*To all whom it may concern:*

Be it known that I, CARY ARTHUR MORRISON, a citizen of the United States, resident of Delaware, in the county of Delaware and State of Ohio, have made a certain new and useful Invention in Elastic Non-Inflatable Tires; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to rubber tires designed mainly for the wheels of motor vehicles and of the non-inflatable elastic type, having for its object to provide a tire having its elasticity increased to a point approximating that of a pneumatic tire and wherein improved means are provided to brace against collapse. Other objects and advantages will hereinafter appear.

The invention consists in the novel construction and combinations of parts as hereinafter set forth.

Figure 1:
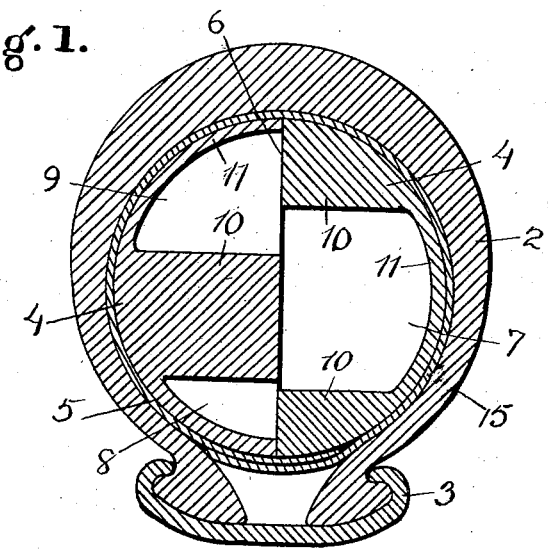
Figure 2:
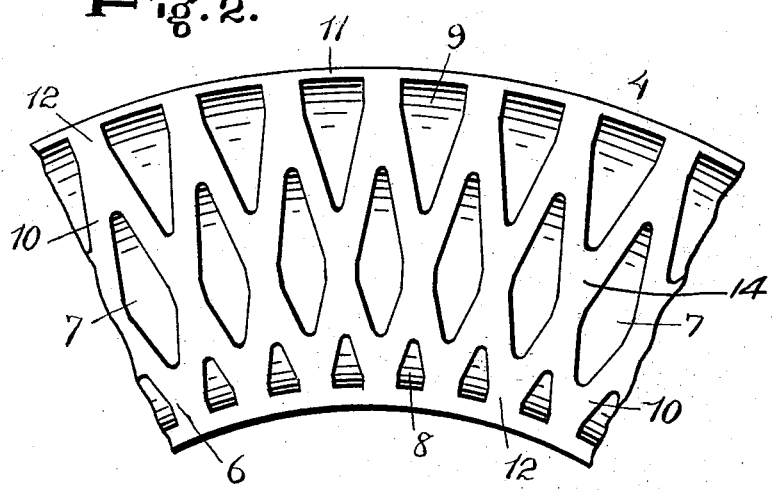

In the accompanying drawings illustrating the invention, Figure 1 is a transverse section of the invention, showing the rim of the wheel, and Fig. 2 is a detail inside face view of one of the annular sections of the core, partly broken away.

In these drawings the numeral 2 designates the outer casing of ordinary character having the usual rim 3, and fitting within said casing is the filling or core constituting the invention.

This core or filling is made in two annular sections, each a duplicate of the other and made in the same mold, each section being numbered 4 and having an outer annular convex face 5 of semi-circular cross section, and an inner flat face or planular face 6, the plane faces of the two sections being in contact with each other.

Each section 4 is provided with a central or middle series of recesses 7 opening at one end into the flat face thereof and having their opposite ends closed, and with inner and outer series of smaller recesses 8 and 9, also opening at one end into the flat face thereof and having their opposite ends closed, the last named or inner and outer series of recesses having the members thereof alined radially but staggered with relation to the members of the central series of recesses, the three series being all true recesses with closed sides and one end open.

These recesses are located between semicircular ribs 10 disposed transversely of the tire and intersecting each other intermediately of their lengths and forming transverse truss connections of the outer concavo-convex or dished wall 11 of the tire, to which said ribs are joined at their curved edges. These ribs are joined at both ends thereof to each other and to the aforesaid dished wall of the tire, and are disposed in intersecting pairs radially of the tire thereby resisting collapse of the tire.

In order to strengthen the truss connections or ribs against collapse under strain of the load, they are provided with thickened combined tie and brace connections 12 with the outer wall 11 of the tire at both ends of said ribs and at both the outer and inner margins of said wall; and said ribs are provided intermediately of their lengths with thickened combined tie and brace connections 14 with each other at their points of intersection. In this way the truss connections or ribs will stand up to almost any load and effectually prevent collapse.

It is preferred that the sections of the tire shall have the recesses thereof staggered; that is to say the recesses of one section will be staggered with relation to the recesses of the other section.

Interposed between the core sections and the casing is preferably a lining 15 of suitable fabric or flexible material to prevent the casing from becoming vulcanized to the tire sections in use, said lining having lapping inner marginal portions.

I claim:—

1. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths to each other and forming transverse truss connections of said outer wall, said ribs being provided with thickened combined tie and brace connections with each other and with thickened combined tie and brace connections with said outer wall.

2. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths to each other and forming transverse truss connections of said outer wall, said ribs being provided with thickened combined tie and brace connections with each other and with thickened combined tie and brace connections with said outer wall, each section having recesses between the ribs thereof and the recesses of one section being staggered with relation to the recesses of the other section.

3. An elastic non-inflatable tire, provided with a core consisting of two annular sections, each of which consists of an outer annular wall of semi-circular cross-section and transverse intersecting semi-circular ribs joined at their curved edges to said outer wall, joined at both ends thereof to each other and to said outer wall and intermediately of their lengths joined to each other, and forming transverse truss connections of said outer wall, said ribs being provided with thickened combined tie and brace connections with each other and with thickened combined tie and brace connections with said outer wall.

4. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths joined to each other and forming transverse truss connections of said outer wall.

5. An elastic non-inflatable tire, provided with a core consisting of two annular sections, each of which consists of an outer annular wall of semi-circular cross-section and transverse intersecting semi-circular ribs joined at their curved edges to said outer wall and intermediately of their lengths joined to each other and forming transverse truss connections of said outer wall, each section having recesses between the ribs thereof and the recesses of one section being staggered with relation to the recesses of the other section.

6. An elastic non-inflatable tire, provided with a core consisting of two annular sections each of which consists of an outer annular dished wall and transverse truss connections of said wall disposed in pairs intersecting each other radially of the tire, the sections having flat meeting faces.

7. An elastic non-inflatable tire, provided with a core consisting of two annular sections, each of which is composed of an outer annular dished wall, and transverse truss connections of said wall disposed radially of the tire in pairs intersecting each other, the sections having flat meeting faces and being provided with recesses between the truss connections, the recesses of one section being staggered with relation to the recesses of the other section.

In testimony whereof I affix my signature, in presence of two witnesses.

C. A. MORRISON.

Witnesses:
 GEO. E. CAYLOR,
 GEORGE M. ANDERSON.

Copies of this patent may be obtained for five cents each, by addressing the "Commissioner of Patents, Washington, D. C."